United States Patent [19]
Asmus

[11] 4,044,609
[45] Aug. 30, 1977

[54] WHEEL-ENGAGING ROLLER STRUCTURE FOR VEHICLE TESTING APPARATUS

[75] Inventor: Carl J. Asmus, Temple City, Calif.

[73] Assignee: Clayton Manufacturing Company, El Monte, Calif.

[21] Appl. No.: 597,170

[22] Filed: July 18, 1975

[51] Int. Cl.² .................... G01M 15/00; G01L 5/28
[52] U.S. Cl. .......................................... 73/117; 73/123
[58] Field of Search ............... 73/117, 123, 124, 125, 73/126, 127, 71.7; 129/121 A, 110

[56] References Cited

U.S. PATENT DOCUMENTS

| 1,982,041 | 11/1934 | Anderson et al. | 73/124 |
|---|---|---|---|
| 2,039,428 | 5/1936 | Lewis | 73/117 |
| 2,185,246 | 1/1940 | Cunningham | 73/123 |
| 2,358,863 | 9/1944 | Tourneau | 29/121 A |
| 2,697,346 | 12/1954 | Kirk | 73/71.7 |

*Primary Examiner*—James J. Gill
*Assistant Examiner*—Anthony V. Ciarlante
*Attorney, Agent, or Firm*—Jackson & Jones

[57] ABSTRACT

A roller is disclosed which is intended to have frictional engagement with a vehicle wheel during a testing operation and which is constructed by welding together: a central supporting shaft, a plurality of outwardly-extending axially-spaced supporting discs, and a plurality of axially-extending members supported in slots on the peripheries of the discs and arranged to provide wheel-engaging ribs extending at right angles to the direction of motion of the wheel periphery.

10 Claims, 7 Drawing Figures

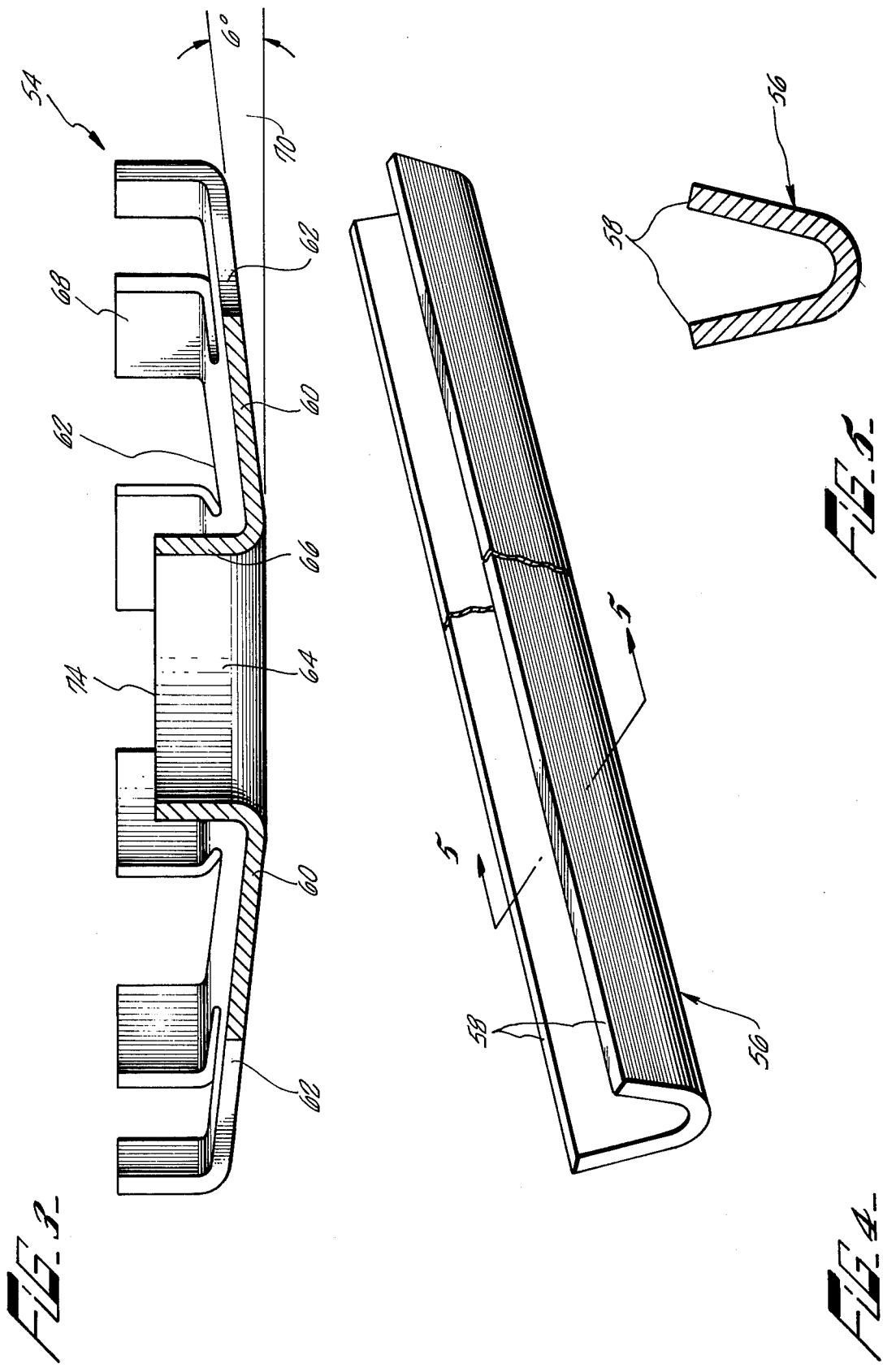

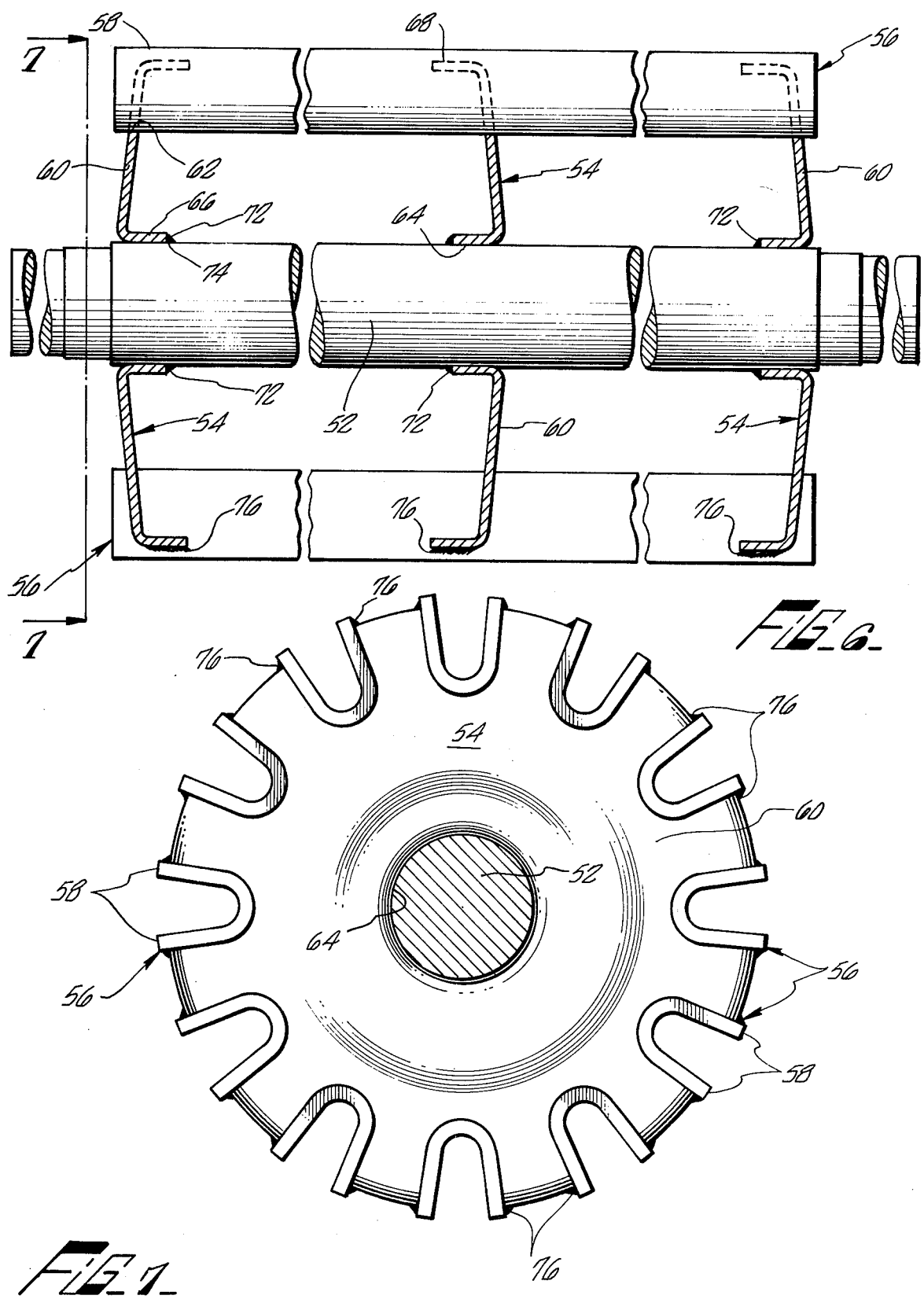

WHEEL-ENGAGING ROLLER STRUCTURE FOR VEHICLE TESTING APPARATUS

BACKGROUND OF THE INVENTION

This invention relates primarily to vehicle testing equipment in which the vehicle wheels are supported upon, and rotate with, rollers in a test bed. The concepts are primarily applicable to situations in which the roller drives the wheel, such as brake analyzers or other motoring dynamometers.

The present invention particularly concerns itself with improving roller construction for use in relatively low speed testing equipment. It could, of course, be used also in higher speed equipment, but the maximum feasible speed tends to be controlled by noise problems.

Lower speed test bed rollers normally require high torque, which means that high traction is necessary to operate properly. In developing high traction, a common prior art expedient is to use ribs on the roller which extend at right angles to the direction of motion of the tire periphery which engages the roller. The ribs press into the tire causing a series of distortions in the tire periphery, i.e., causing localized indentations in the tire where the ribs engage, and bulges in the tire between successive ribs. This tends to lock the tire and roller together in their rotational movements, resulting in low slippage. In Europe, where low speed dynamometers are used extensively, other types of roller structures used to develop high traction have been porous concrete roller surfaces and expanded metal roller surfaces. Both of these expedients, particularly the latter, tend to abrade the tire surface.

My invention uses axially-extending ribs on the roller, but the roller is so constructed that several valuable advantages are obtained:

a. The cost of constructing the rollers is minimized, particularly for a manufacturer having adequate press-working, or stamping equipment;

b. The roller is particularly easy on the tire surface, and also has higher traction than most others;

c. When the tire-engaging ribs wear down, this construction permits convenient and inexpensive replacement of the ribs without altering the basic construction of the roller; and d. Water is quickly drained from the roller-engaging tire surface due to the open construction of the roller.

SUMMARY OF THE INVENTION

This invention relates to a built-up roller for test equipment which is constructed by securing together: a central shaft-like supporting member, a plurality of axially-spaced outwardly extending disc-like supporting members, and a plurality of axially-extending rib-providing members supported on the peripheries of the disc-like supporting members. Both the construction of the roller and the method of manufacturing the roller are considered to be novel.

BRIEF DESCRIPTION OF THE DRAWINGS

FIGS. 2 and 3 show one of the supporting discs or annuli, of the test-bed roller prior to assembly into the roller structure, FIG. 2 being an outline view of the disc, and FIG. 3 being a section on the line 3—3 of FIG. 2.

FIGS. 4 and 5 show one of the axially-extending tire-engaging channel members of the test-bed roller prior to assembly into the roller structure, FIG. 4 being a view in perspective, and FIG. 5 being a cross-sectional view on the line 5—5 of FIG. 4.

FIG. 6 is a plan view, partly in section, showing the completed roller structure; and FIG. 7 is an end view of the roller structure of FIG. 6, taken on the line 7—7 of FIG. 6.

DETAILED DESCRIPTION OF THE PREFERRED EMBODIMENT

Figure 1:
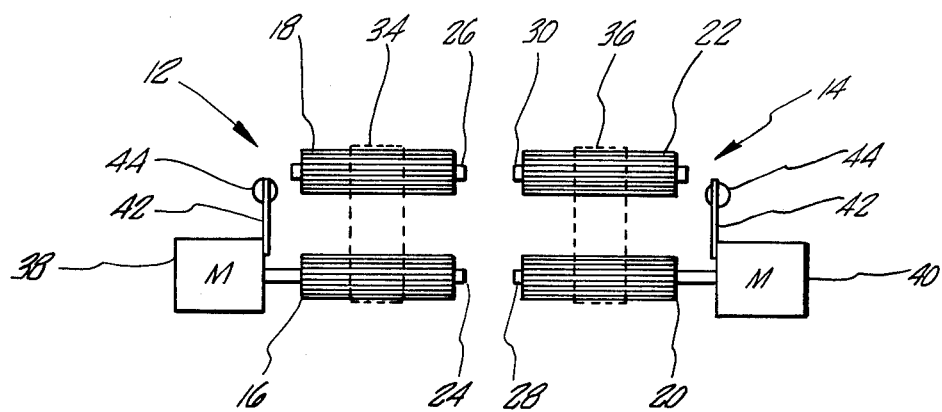
FIG. 1 is a diagrammatic plan view of a vehicle test bed for a dynamometer, having tire-engaging rollers for both the left and right vehicle wheels.

In FIG. 1, a vehicle test bed is shown having a left wheel bed 12 and a right wheel bed 14. In bed 12 are two rollers, a drive roller 16 and an idler roller 18. In bed 14 are a drive roller 20 and an idler roller 22. The supporting shafts 24, 26, 28, and 30 of the respective rollers provide their support and define their axes of rotation. Suitable bearings support the ends of the four supporting shafts.

Each vehicle tire (left and right wheels) rests on one pair of rollers. Assume the left vehicle tire 34 is supported on the rollers 16 and 18, and the right tire 36 is supported on the rollers 20 and 22. During the testing of the vehicle brakes, the drive rollers 16 and 20 are rotated by electric motors 38 and 40, respectively. The motor housings may be supported in cradle bearings, so that motor reaction torque forces from each motor housing may be transferred by torque arms 42 to force transducers 44 which measure the brake effort. The electric motors 38 and 40 have gear reduction drives to provide relatively low speed roller rotation.

As shown in FIGS. 6 and 7, my improved roller structure comprises broadly a center shaft 52; a plurality of generally disc-shaped, or annular, supporting members 54, which are secured to the shaft 52, and which extend outwardly from the shaft in a generally radial direction; and a plurality of axially-extending, tire-engaging members 56, which are secured to the peripheries of the disc members 54 to provide a series of tire-engaging ribs 58 and to complete the hollow, but effectively reinforced, roller structure.

The shaft 52 provides the structural center of the roller and is the part of the roller supported on suitable bearings. It need not extend continuously through the full axial dimension of the roller, since its function could be supplied by separate shaft-like members extending into each end of the roller.

Figure 2:
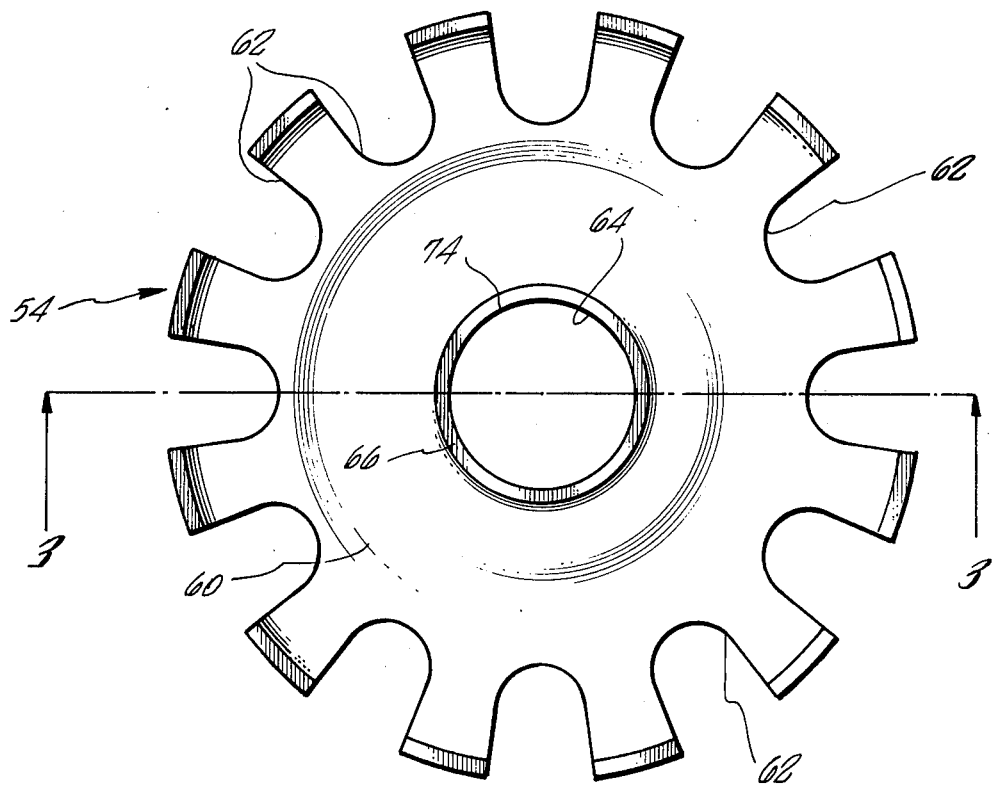

FIGS. 2 and 3 show one of the disc-shaped supporting members 54 prior to assembly of the roller. This member 54, and each of the other members 54, has a web portion 60 and is formed with a series of slots, or notches, 62 in its periphery. The center of the disc member 54 has a shaft-receiving opening 64 and an integral axially-extending flange 66 through which the shaft will extend when assembled, the flange serving to position the disc on the shaft, to strengthen the disc member, and to provide a convenient welding surface for attaching the disc member to the shaft. Between each pair of successive notches 62 in the periphery of the disc member 54 is a bent-over flange, or finger, 68 which extends a short distance axially. The fingers 68 stiffen the disc member and provide welding surfaces for securing the rib members 56 to the disc member 54.

The web 60 of each disc member is preferably inclined somewhat from a plane perpendicular to the axis of rotation. This angle of inclination, which is indicated by the numeral 70 in FIG. 3, is shown as 6°. In the assembled unit, the disc members at opposite ends of the roller are oppositely inclined, i.e., the radially outer ends of the end webs are closer to one another than their radially inner ends. This provides a strengthened structure for resisting lateral deflection. If there are four disc members, the inner pair may also be oppositely inclined for additional strengthening. Obviously, the size of the angle of inclination may be varied substantially to provide the lateral stiffening needed in different designs, subject to the limitations imposed by the process used in shaping the disc members.

It will be apparent that the disc members 54 may be formed by the relatively efficient technique of press-working, or stamping. This provides for economy in manufacturing the rollers, assuming, of course, that suitable equipment is available in the manufacturing facility.

In forming each of the disc members 54, the preferred method is to blank out the disc in a cutting operation, establishing the outside diameter and a center hole. The disc is then punched to cut the slots 62 in its periphery. The peripheral flanges 68 are shaped in a forming die. The angle of inclination of the web 60 may be developed during the same operation. The central flange 66 is drawn to the illustrated shape. This operation could be performed at a single station if sufficiently expensive equipment were used; otherwise it can be accomplished in a plurality of successive drawing steps.

FIGS. 4 and 5 show one of the longitudinal rib-providing members 56 prior to assembling the roller structure. Separate strips could be used to provide each tire-engaging rib 58. However, for simplicity and economy, I prefer to provide two adjacent ribs 58 by using a single metal channel 56, which is U-shaped, or V-shaped, in cross section, as shown. Each U-shaped or V-shaped, channel 56 is formed from a strip of sheet metal, which is folded over in a suitable press. Hot rolled mild steel is preferred, because its edges, which become the tire-engaging ribs 58, are slightly rolled, thereby avoiding sharp corners at the tire contact points. Standard commercially available structural steel angles or channels could be used to provide the tire-engaging ribs 58.

The final roller structure is made by welding the disc members 54 to the shaft (or shafts) 52, and welding the rib-providing channel members 56 to the disc members 54, after inserting the channel members in the peripheral slots, 62 of the disc members. The channel members 56 are preferably formed with a somewhat wider angle than that between the sides of the slots, so that the channel members need to be forced into the slots, assuming a slightly smaller angle of divergence as they are forced into assembled position.

As shown in FIG. 7, the number of channel members 56 is 12, providing 24 tire-engaging ribs 58. The number of such members may, of course, be varied in accordance with particular roller size and traction requirements.

In welding the structural elements together, I find it convenient to provide a series (say 4) of arcuate incremental welds 72, each about 1 inch long, between the shaft 52 and the edge 74 of the flange 66 of each disc member 54; and to provide welds 76 between the outer surface of each flange, or finger, 68 of each disc member 54 and the adjacent outer surface of each channel member 56.

From the foregoing illustrative description it is apparent that several advantages have been obtained, as enumerated in discussing the Background of the Invention:

a. The construction of the rollers may be accomplished efficiently and at a relatively low manufacturing cost because of the use of press-formed elements.

b. The tire-engaging ribs 58 provide excellent traction, as needed, but they do not tend to damage the tires, as is the case with some roller structures heretofore used.

c. One of the problems encountered with rollers of this type has been the wearing out of the rollers themselves. With my rib-providing channels 56, it is a simple matter to replace worn ribs by forming new channel members, which fit inside the original channel members, and which provide new tire-engaging ribs. Such replacement channel members would, of course, have dimensions designed to fit into the V-shaped (or U-shaped) openings of the original channel members.

d. Because of the open spaces between the circumferentially-spaced channel members 56 and the open spaces between the axially-spaced disc members 54, the roller structure permits rapid drainage of any water on the tire, so that the traction-reducing tendency of a wet tire is minimized.

The various modifications which may be made in my improved roller structure without departing from its general concepts are intended to be included within the scope of the following claims.

What is claimed is:

1. A roller adapted to engage and drive a wheel for testing purposes, comprising:
    a shaft extending along the axis of rotation of the roller at least part of the roller's axial length,
    a plurality of generally disc-shaped supporting members secured to the shaft at axially spaced points and extending generally radially outward from the shaft,
    said disc-shaped supporting members each having a plurality of circumferentially-spaced slots formed in its periphery and axially aligned with corresponding slots in the other supporting member or members, and
    a plurality of axially extending wheel-engageable members secured to the disc-shaped members and supported in the slots formed therein, each said wheel engageable member having a substantially V-shaped cross-section, each side of which provides a wheel-engageable rib.

2. The roller of claim 1 wherein there are at least three said disc-shaped supporting members.

3. A roller construction as set forth in claim 2 in which two of the disc-shaped members are inclined in opposite directions from a plane perpendicular to the roller's axis of rotation in order to resist lateral deflection forces.

4. A roller adapted to engage and drive a wheel for testing purposes, comprising:
    a shaft extending along the axis of rotation of the roller at least part of the roller's axial length,
    a plurality of generally disc-shaped supporting members secured to the shaft at axially spaced points and extending generally radially outward from the shaft,
    said disc-shaped supporting members each having a plurality of circumferentially-shaped slots formed in its periphery and axially aligned with corresponding slots in the other supporting member or members, and a plurality of axially extending wheel-engageable members secured to the disc-shaped members and supported in the slots formed therein, each said wheel engageable member having a cross-sectional form which provides two parallel circumferentially-spaced wheel-engageable ribs.

5. The roller of claim 4 wherein there are at least three said disc-shaped supporting members.

6. A roller construction as set forth in claim 5 in which two of the disc-shaped members are inclined in opposite directions from a plane perpendicular to the roller's axis of rotation in order to resist lateral deflection forces.

7. A roller, adapted to engage and drive a wheel for brake testing purposes, comprising:
   a shaft extending along the axis of rotation of the roller at least part of the roller's axial length,
   a plurality of generally disc-shaped supporting members secured to the shaft at axially-spaced points and extending generally radially outward from the shaft, and
   a plurality of axially-extending wheel-engageable members each wheel engageable member secured to and supported by the disc-shaped members, and having a cross-section which provides two circumferentially-spaced wheel-engageable ribs.

8. The roller of claim 7 wherein there are at least three said disc-shaped supporting members.

9. A roller construction as set forth in claim 8 in which two of the disc-shaped members are inclined in opposite directions from a plane perpendicular to the roller's axis of rotation in order to resist lateral deflection forces.

10. In a brake tester, a roller for engaging and driving a wheel comprising:
   a plurality of physically distinct, unitary rib-bearing members, each rib bearing member providing two wheel engaging surfaces; and
   a plurality of support member means spaced apart from one another on a common axis each having slot means therein for mounting each of said rib-bearing members spaced apart from one another on the circumference of a cylinder such that the wheel engaging surfaces of each rib-bearing member are oriented in a wheel engaging position and such that each said rib-bearing member is individually replaceable.

* * * * *